(12) United States Patent
Isham

(10) Patent No.: US 7,535,211 B2
(45) Date of Patent: May 19, 2009

(54) VOLTAGE REGULATOR HAVING CURRENT CANCELING COMPENSATION

(75) Inventor: Robert H. Isham, Flemington, NJ (US)

(73) Assignee: Intersil Americas Inc., Milpitas, CA (US)

( * ) Notice: Subject to any disclaimer, the term of this patent is extended or adjusted under 35 U.S.C. 154(b) by 342 days.

(21) Appl. No.: 11/528,251

(22) Filed: Sep. 27, 2006

(65) Prior Publication Data

US 2007/0273348 A1 Nov. 29, 2007

Related U.S. Application Data

(60) Provisional application No. 60/802,949, filed on May 24, 2006.

(51) Int. Cl.
*G05F 1/40* (2006.01)
(52) U.S. Cl. ....................................................... 323/284
(58) Field of Classification Search ................. 323/282, 323/284, 288, 351
See application file for complete search history.

(56) References Cited

U.S. PATENT DOCUMENTS

| | | | |
|---|---|---|---|
| 5,264,782 A * | 11/1993 | Newton | 323/288 |
| 5,471,174 A * | 11/1995 | Petty et al. | 330/257 |
| 6,388,451 B1 * | 5/2002 | Burba et al. | 324/522 |
| 6,437,999 B1 * | 8/2002 | Wittenbreder | 363/39 |
| 2006/0164055 A1 * | 7/2006 | Hata et al. | 323/282 |

\* cited by examiner

*Primary Examiner*—Adolf Berhane
(74) *Attorney, Agent, or Firm*—Fogg & Powers LLC

(57) ABSTRACT

A voltage regulator which includes a network for improved compensation for reference voltage changes includes an IC including an error amplifier and a pulse width modulator (PWM), wherein an input of the PWM is coupled to an output of the error amplifier. A low pass filter comprising an inductor is in series with a grounded capacitor coupled to an output of the PWM, wherein an output of the regulator (Vout) is at a node between the inductor and the capacitor. A first feedback network is disposed between Vout and an inverting input of the error amplifier and a second feedback network is disposed between an output of the error amplifier and the inverting input of the error amplifier. A current cancellation network is coupled to the inverting input of the error amplifier. The current cancellation network injects a canceling current into the inverting input that is substantially equal in magnitude and opposite in polarity to current flowing through the second feedback network triggered by a change in reference voltage when applied to the error amplifier.

21 Claims, 3 Drawing Sheets

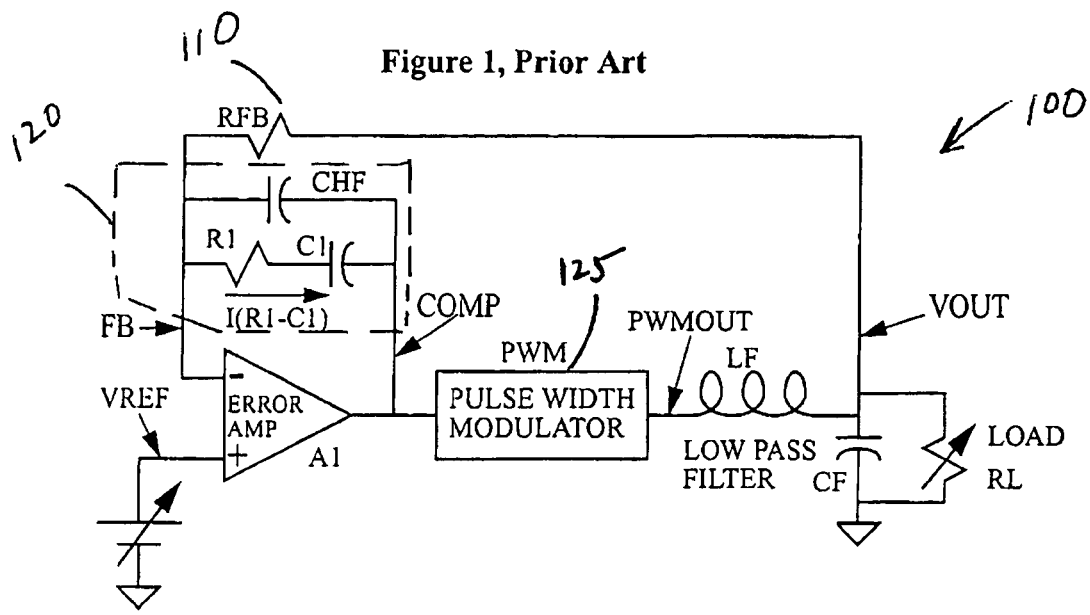
Figure 1, Prior Art
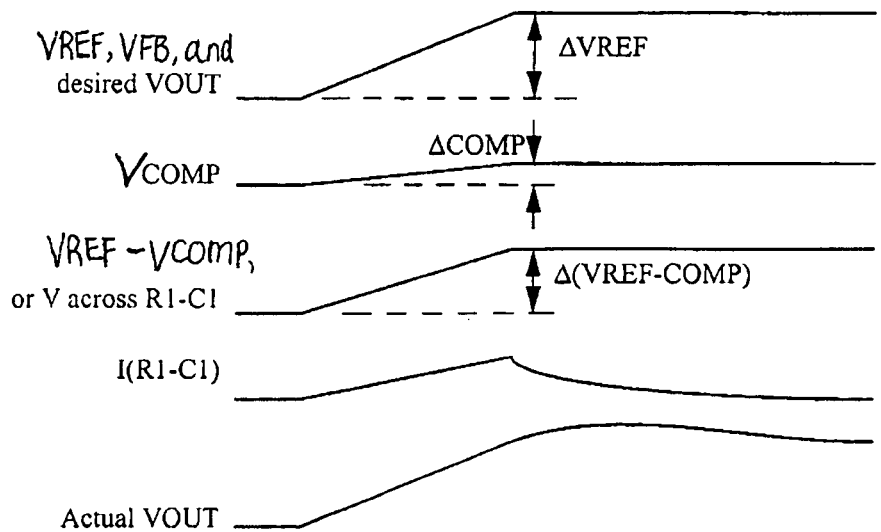
Figure 2, Response to a ΔVREF, long R1-C1 Time Constant
PRIOR ART

VOLTAGE REGULATOR HAVING CURRENT CANCELING COMPENSATION

CROSS-REFERENCE TO RELATED APPLICATIONS

This application claims the benefit of Provisional Application No. 60/802,949 filed on May 24, 2006, which is incorporated by reference in its entirety in the present application.

FIELD OF THE INVENTION

The invention relates to closed loop voltage regulators, and more particularly to switching regulators having compensation networks for improving transient response.

BACKGROUND OF THE INVENTION

When selecting compensation component values for closed loop voltage regulators there is usually a compromise between values that allow good response to load step changes and values that allow good response to reference voltage changes. That is, component values that provide a fast settling response to load current step changes may cause unacceptable overshoot levels when the voltage reference, and therefore, output voltage, is changed to a new value.

FIG. 1 shows the schematic of a typical closed loop pulse width modulated DC-DC converter 100. In operation, a reference voltage, $V_{REF}$, is applied to the non-inverting input of an error amplifier, A1. The output of A1, node COMP, drives a pulse width modulator, PWM 125, whose output, $PWM_{OUT}$, is filtered by LF and CF and becomes the converter's output voltage, $V_{OUT}$, across the load RL.

$V_{OUT}$ has a relationship to the voltage at node COMP, usually a gain >1, arbitrarily designated as K1, plus generally some voltage offset. $V_{OUT}$ is fed back to a node shown as FB, which is common to the inverting input of A1, through feedback network 110 shown in FIG. 1 as resistor RFB. Another feedback network, 120, shown with a box defined by dashed lines, is employed between node FB and node COMP of amplifier A1. Feedback network 120 shown in FIG. 1 comprises R1, C1, $C_{HF}$. Feedback networks 110 and 120 set the stability and other operating characteristics of converter 100. Generally, $C_{HF}$ is a much higher impedance than C1, and can be ignored when typical operation of circuit 100 is analyzed.

In the steady state, amplifier A1 drives the COMP node to $V_{COMP}$, and consequently $V_{OUT}$, so that the voltage at node FB ($V_{FB}$) is equal to $V_{REF}$. Except for transient effects, $V_{OUT}$ equals $V_{REF}$ and $V_{FB}$ is equal to $V_{REF}$. A particular PWM circuit might be best compensated for load current changes with values of R1 and C1 having a relatively long RC time constant.

However, a long RC time constant generally produces an unacceptable overshoot in $V_{OUT}$ when responding to a change in $V_{REF}$. Referring to FIGS. 1 and 2, if $V_{REF}$ is changed by an amount $\Delta V_{REF}$, A1 will change $V_{COMP}$ by the amount $\Delta V_{COMP}$, which in turn drives the PWM, so as to make the desired $V_{OUT}$ and the voltage $V_{FB}$ in the steady state to also change by $\Delta V_{REF}$. Note that, because there is a gain of K1 through PWM 125 and the low pass filter comprising LF and CF, $\Delta V_{COMP}$ equals $\Delta V_{REF}/K1$. This produces a change in voltage across the series combination of R1 and C1 being the difference between $\Delta V_{REF}$ and $\Delta V_{REF}/K1$. If $V_{REF}$ changes by $\Delta V_{REF}$, then voltage across R1–C1 becomes $\Delta V_{REF}-\Delta V_{REF}/K1$, or $\Delta V_{REF}*(1-1/K1)$. If the impedance of R1 and C1 is designated as Z1, then a current I(R1–C1) is produced that is equal to $\Delta V_{REF}*(1-1/K1)/Z1$.

Referring to FIGS. 1 and 2, if $V_{REF}$ is changed by an amount $\Delta V_{REF}$, A1 will drive the node to $V_{COMP}$, which in turn drives the PWM, so as to make the desired $V_{OUT}$ and the voltage $V_{FB}$ in the steady state to also change by $\Delta V_{REF}$. However, because there is a gain of K1 through PWM 125 and the low pass filter comprising LF and CF, $V_{COMP}$ only changes by $\Delta V_{REF}/K1$. This produces a voltage across the series combination of R1 and C1 being the difference being between the $V_{FB}$ and the $V_{COMP}$. If $V_{REF}$ changes by $\Delta V_{REF}$, then voltage across R1–C1 becomes $\Delta V_{REF}-\Delta V_{REF}/K1$, or $\Delta V_{REF}*(1-1/K1)$. If the impedance of R1 and C1 is designated as Z1, then a current I(R1–C1) is produced that is equal to $\Delta V_{REF}*(1-1/K1)/Z1$.

I(R1–C1) occurs at the FB node. There is no other path associated with the FB node for this current to flow except from $V_{OUT}$ through feedback resistor RFB. A voltage drop will therefore result across RFB, making the actual $V_{OUT}$ mismatch $V_{FB}$, resulting in a mismatch of $V_{OUT}$ with $V_{REF}$.

FIG. 2 shows the simulated response of various nodes of converter 100 when R1, C1 provides a relatively long time constant network resulting from a change in $V_{REF}=\Delta V_{REF}$. As noted above, due to gain K1 through PWM 125 and the low pass filter comprising LF and CF, $V_{COMP}<V_{REF}$. As a result, I(R1–C1) is seen. This current results in the actual $V_{OUT}$ being seen to not closely track $V_{REF}$ (which is equal to the Desired $V_{OUT}$). This results in the undesirable overshoot shown in $V_{OUT}$ for a change in $V_{REF}$, which generally forces a compromise in the component values, such as a reduction in the R1C1 time constant. However, as noted above, a reduction in the R1C1 time constant degrades the response of circuit 100 to load step changes. What is needed is a pulse width modulated converter design that allows selection of compensation component values that removes the tradeoff in performance between response to changes in load steps and response to reference voltage changes.

SUMMARY

A voltage regulator comprises an IC including an error amplifier and a pulse width modulator (PWM), wherein an input of the PWM is coupled to an output of the error amplifier. A low pass filter comprising an inductor is in series with a grounded capacitor is coupled to an output of the modulator, wherein an output of the regulator (Vout) is at a node between the inductor and the capacitor. A first feedback network is disposed between Vout and an inverting input of the error amplifier and a second feedback network is disposed between an output of the error amplifier and the inverting input of the error amplifier. A current cancellation network is coupled to the inverting input of the error amplifier. The current cancellation network injects a canceling current into the inverting input that is substantially equal in magnitude and opposite in polarity to current flowing through the second feedback network triggered by a change in reference voltage when applied to the error amplifier.

The current cancellation network is preferably disposed between the inverting and non-inverting inputs of the error amplifier. The current cancellation network is preferably on the IC and in one embodiment comprises a first amplifier (e.g. operational amplifier) and an RC comprising network driven by the first amplifier. The first amplifier generally provides a gain >1.

In one embodiment, a time constant of the RC comprising network substantially equals a time constant of the second feedback network. This arrangement permits the same R and C to be used in the respective networks. In one embodiment, the first amplifier is on the IC, and an output of the first amplifier is connected to a bond pad of IC for connection as an external pin of the IC.

The voltage regulator can include structure supporting at least one IC pin that provides a fixed gain being>1 for the first amplifier. In one embodiment of this arrangement, the fixed gain can equal 2−1/(a gain through the PWM and the low pass filter).

In the embodiment where the current cancellation network comprises a first amplifier and an RC comprising network driven by the first amplifier, the converter can further comprise structure for detecting a gain of the PWM and adjusting a gain of the first amplifier to track the gain of the PWM.

A method of current cancellation for voltage regulators to improve compensation for reference voltage changes comprises the steps of providing a voltage regulator comprising error amplifier and a pulse width modulator (PWM), wherein an input of the PWM is coupled to an output of the error amplifier, a low pass filter comprising an inductor in series with a grounded capacitor coupled to an output of the PWM, wherein an output of the regulator (Vout) is at a node between the inductor and the capacitor, a first feedback network disposed between Vout and an inverting input of the error amplifier and a second feedback network disposed between an output of the error amplifier and the inverting input of the error amplifier. A canceling current is injected into the inverting input that is substantially equal in magnitude and opposite in polarity to current through the second feedback network triggered by a change in reference voltage applied to the error amplifier.

The cancellation network can comprise a first amplifier and an RC comprising network driven by the first amplifier for providing the canceling current. In this arrangement the method can further comprise the step of detecting a gain of the PWM and adjusting a gain of the first amplifier to track the gain of the PWM, wherein current cancellation of the current through the second feedback network triggered by a change in reference voltage applied to the error amplifier is automatically provided by the adjusting of the first amplifier gain.

In an embodiment where the regulator includes an IC pin that provides at least one fixed gain>1 for the first amplifier, the method can further comprise the step of connecting the RC comprising network external to the IC between this IC pin and the pin connected to the inverting input of the error amplifier. In this embodiment the method can further comprise the step of setting a fixed gain equals 2−1/(the gain through the PWM and the low pass filter), wherein an impedance of the RC comprising network equals an impedance of the second feedback network.

BRIEF DESCRIPTION OF THE DRAWINGS

A fuller understanding of the present invention and the features and benefits thereof will be accomplished upon review of the following detailed description together with the accompanying drawings, in which:

FIG. 1 shows the schematic of a known closed loop pulse width modulated DC-DC converter.

FIG. 2 shows the simulated response at several nodes of converter 100 shown in FIG. 1 to a change in reference voltage.

DETAILED DESCRIPTION

A voltage regulator comprises an error amplifier coupled to a pulse width modulator (PWM), where an input of the PWM is hooked to an output of the error amplifier. A low pass filter comprising an inductor in series with a grounded capacitor is coupled to an output of the modulator, wherein an output of the regulator (Vout) is at a node between the inductor and the capacitor. A first feedback network is disposed between Vout and an inverting input of the error amplifier and a second feedback network is disposed between an output of the error amplifier and the inverting input the error amplifier. A current cancellation network according to the invention is disposed between the inverting input of the error amplifier and a non-inverting input of the error amplifier.

The current cancellation network automatically injects a current into node FB that is substantially equal in magnitude and opposite in polarity to I(R1−C1) which flows through $R_{FB}$ during $V_{REF}$ changes as described above relative to circuit 100 shown in FIG. 1. As a result, current into node FB cancels current out of the node, as they are of opposite polarity. "Substantially equal" as used herein generally refers to an injected current which matches equally enough with I(R1−C1) that the $V_{OUT}$ overshoot during changes in $V_{REF}$ is reduced to a predetermined maximum acceptable level, such as <10 mV. A reduced overshoot of several mV may still be present if there is a mismatch between the current provided by the current cancellation network and the (I(R1−C1) current, the overshoot magnitude being the current mismatch multiplied by the resistance of $R_{FB}$. For example, if a 3 mV overshoot is the maximum acceptable level, then this current mismatch needs to be less than 3 mV/$R_{FB}$.

Cancellation thus essentially eliminates, or at least significantly reduces, the current flow through $R_{FB}$ which occurs when $V_{REF}$ changes. Since $V_{FB}$ remains essentially equal to $V_{OUT}$, the overshoot due to changes in $V_{REF}$ can be essentially eliminated. Accordingly, closed loop voltage regulators having current cancellation networks according to the invention remove the compromise when selecting compensation component values and thus allow good response to changes in both load step and reference voltage.

Figure 3:
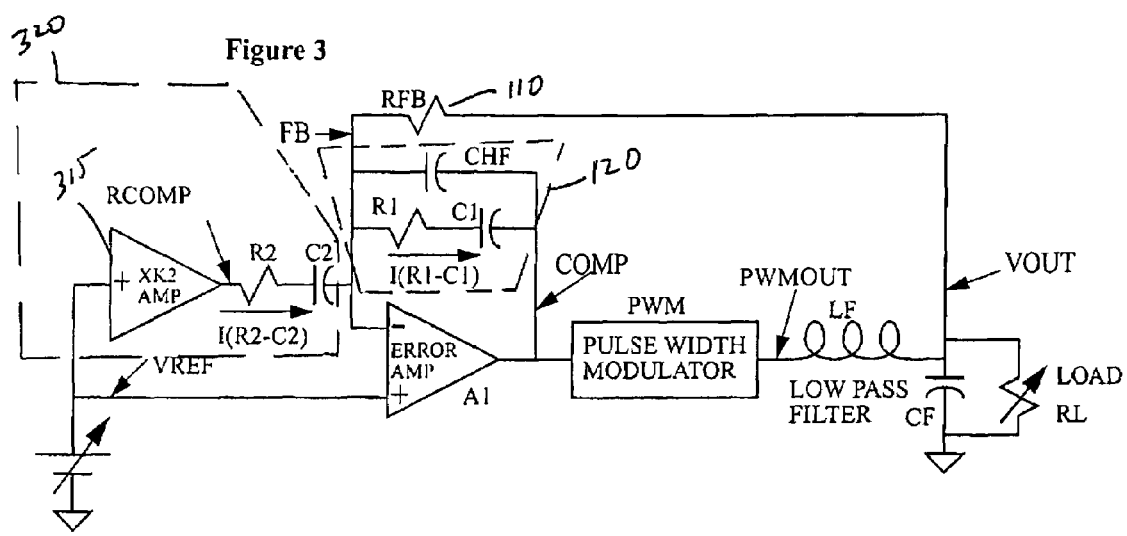
FIG. 3 shows the schematic of a closed loop pulse width modulated DC-DC converter including an exemplary current cancellation network according to an embodiment of the invention.

Referring to FIG. 3, a closed loop pulse width modulated DC-DC converter 300 is shown including an exemplary current cancellation network 320 shown in a box defined by dashed lines according to the invention. The other components of converter 300 are generally the same as the components described relative to converter 100 shown in FIG. 1. For simplicity only, converter 300 will be assumed to have the same configuration as converter 100 and be referred to accordingly for like components.

Exemplary current cancellation network 320 shown in FIG. 3 comprises amplifier 315 which drives an RC network comprising resistor R2 in series with capacitor C2. Amplifier 315 provides a gain shown of K2. In one embodiment, amplifier 315 comprises an operational amplifier having a resistor divider providing voltage feedback from its output to its inverting input to provide the desired gain of K2. In the case of an operational amplifier and a resistor divider comprising input resistor R1 having its other end grounded and a feedback resistor R2, operated in the well known non-inverting configuration, the K2 gain is 1+R2/R1. Amplifier 315 is generally on chip. Other components shown in FIG. 3 can be placed on or off chip, although usually LF and CF cannot be on chip due to size constraints.

Current cancellation network 320 generally includes at least one amplifier and an RC network. However, other current cancellation network embodiments which provide currents which are substantially equal and opposite in polarity to I(R1–C1) generated during $V_{REF}$ changes are within the scope of the invention.

The voltage at the output node of amplifier 315, RCOMP, $V_{RCOMP}$, is an amplified copy of $V_{REF}$, with the gain, K2, of amplifier 315, being greater than 1. R2 and C2 are connected between node RCOMP and node FB. As noted above, the RCOMP node could be an external pin to provide user adjustability by employing an external RC or other suitable reactive network between the RCOMP and FB pin.

Regarding operation of closed loop pulse width modulated DC-DC converter 300, for a change in $V_{REF}=\Delta V_{REF}$, $V_{RCOMP}$ changes by $K2*\Delta V_{REF}$. Since the voltage at node FB is driven by A1 to match $V_{REF}$, then the voltage across the network driven by amplifier 315 (R2–C2 in FIG. 3) changes by $K2*\Delta V_{REF}-\Delta V_{REF}$, or $(K2-1)*\Delta V_{REF}$. Current cancellation network 320 thus injects a current into FB, of I(R2–C2), that is opposite in polarity relative to I(R1–C1). As a result, the current flow through RFB 10 during $V_{REF}$ changes is essentially eliminated and as a result $V_{FB}$ and $V_{OUT}$ closely track. This eliminates, or at least substantially eliminates, overshoot due to changes in $V_{REF}$.

Appropriate values for R2 and C2 for canceling essentially the entire I(R1–C1) can be calculated as follows. In a preferred embodiment, the time constant of $R_2C_2$ equals the time constant of $R_1C_1$. If $R_2C_2$ has the same time constant as $R_1C_1$, and the impedance of $R_2C_2$ is referred to as Z2, by setting I(R1–C1)=I(R2–C2), results in:

$$(K2-1)*\Delta V_{REF}/Z2=(1-1/K1)*\Delta V_{REF}/Z1.$$

The above equation reduces to $Z2=Z1*(K2-1)/(1-1/K1)$. For example, if K2=2, and the gain K1 through PWM and the low pass filter=8, then $Z2=Z1*8/7$ for I(R2–C2) to cancel I(R1–C1).

As noted above, the invention provides the option to provide the RCOMP node as an external IC pin of converter 300. This arrangement allows the current provided by the current cancellation to be adjustable external to the IC.

Figure 4:
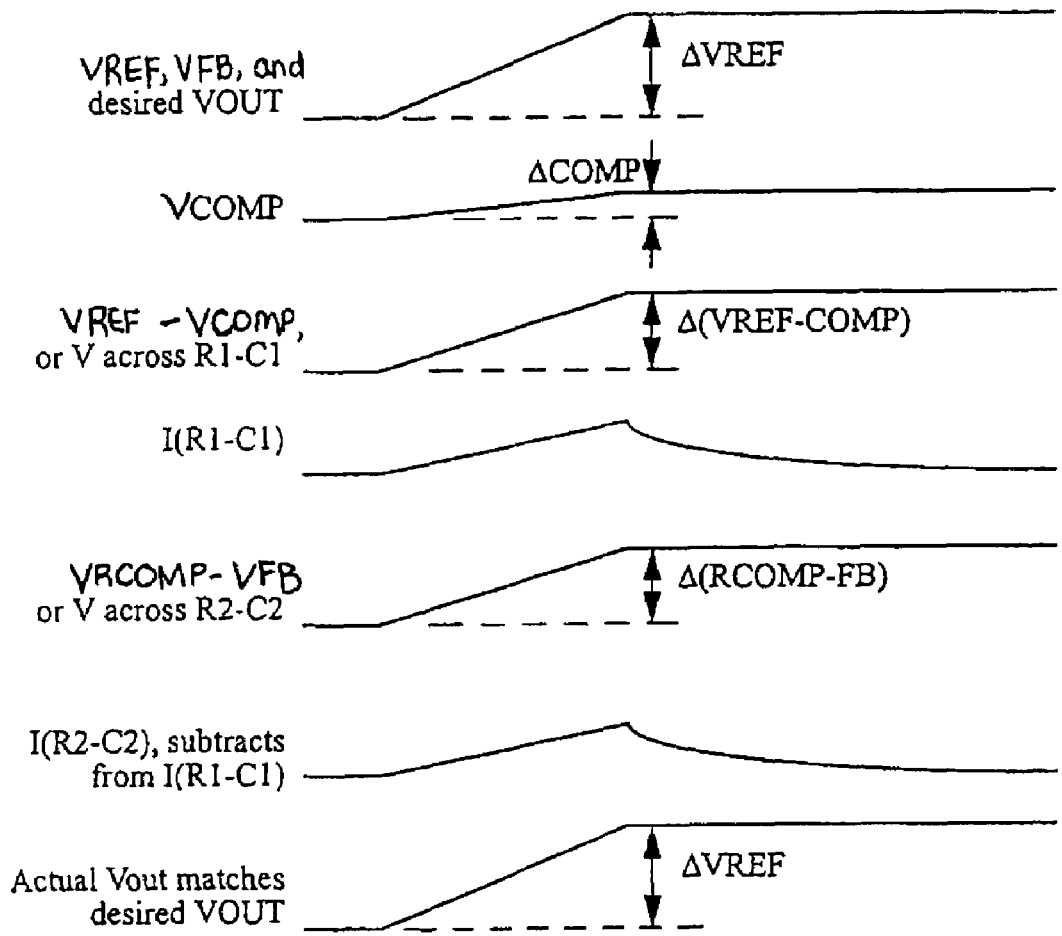
FIG. 4 shows the response at several nodes of the converter circuit shown in FIG. 3 to a change in reference voltage ($V_{REF}$).

FIG. 4 illustrates the simulated transient performance of the closed loop pulse width modulated DC-DC converter 300 having current cancellation network 320 shown schematically in FIG. 3. Since the current generated by current cancellation network 320 I(R2–C2) is equal to I(R1–C1), the actual $V_{OUT}$ is seen to closely match the desired $V_{OUT}$.

Another embodiment of the invention includes at least one IC pin that has a fixed gain, K2, greater than one, compared to $V_{REF}$. The user could then apply an external R-C network between that pin and the error amplifier's inverting input, FB. A subset of the above embodiment would be to make the gain equal exactly 2–1/K1, so that Z2=Z1, and the same value components could be used for both R1,C1 and R2,C2.

Another embodiment involves detecting the actual modulator gain, that is variation in K1, to make K2 track K1 so that the value of Z2 does not have to change as the modulator gain changes to provide essentially complete current cancellation. That is, the value of (K2–1)/(1–1/K1) would remain a constant. It is noted that unless a modulator is equipped with feedforward compensation, the modulator gain K1 is proportional to the voltage at the input to the PWM filter. Through well known multiplying techniques, this voltage could be used to modify the gain K2.

The invention can be used to provide improved switching regulator circuits which benefit from precise Vout tracking, including DC-DC converters, motor controller circuits, and the like.

It is to be understood that while the invention has been described in conjunction with the preferred specific embodiments thereof, that the foregoing description as well as any examples provided are intended to illustrate and not limit the scope of the invention. Other aspects, advantages and modifications within the scope of the invention will be apparent to those skilled in the art to which the invention pertains.

The invention claimed is:

1. A voltage regulator, comprising:
    a controller comprising error amplifier and a pulse width modulator (PWM), wherein an input of said PWM is coupled to an output of said error amplifier;
    an energy storage circuit coupled to an output of said PWM and an output of said regulator (Vout);
    a first feedback network disposed between said Vout and an inverting input of said error amplifier;
    a second feedback network disposed between an output of said error amplifier and said inverting input of said error amplifier, and
    a current cancellation network coupled to said inverting input of said error amplifier, said current cancellation network injecting a canceling current into said inverting input that is substantially equal in magnitude and opposite in polarity to current through said second feedback network triggered by a change in reference voltage applied to said error amplifier.

2. The voltage regulator of claim 1, wherein said current cancellation network is disposed between said inverting input of said error amplifier and a non-inverting input of said error amplifier.

3. The voltage regulator of claim 1, wherein said current cancellation network and said controller are disposed on an integrated circuit (IC).

4. The voltage regulator of claim 3, wherein said current cancellation network comprises a first amplifier and a resistor-capacitor (RC) network driven by said first amplifier.

5. The voltage regulator of claim 4, wherein said first amplifier is operable to provide a gain greater than 1.

6. The voltage regulator of claim 4, wherein a time constant of said RC network substantially equals a time constant of said second feedback network.

7. The voltage regulator of claim 4, wherein said first amplifier is disposed on said IC, wherein an output of said first amplifier is connected to a bond pad of said IC for connection as an external pin of said IC.

8. The voltage regulator of claim 4, wherein said regulator includes at least one IC pin that provides a fixed gain greater than 1 for said first amplifier.

9. The voltage regulator of claim 8, wherein said fixed gain is a function of a gain through said PWM and said low pass filter.

10. The voltage regulator of claim 4, further comprising means for detecting a gain of said PWM and adjusting a gain of said first amplifier to track said gain of said PWM.

11. A method of current cancellation for a voltage regulator, the method comprising:
    inputting a reference voltage into a first input of a first amplifier in the voltage regulator;
    inputting a feedback signal from an output of the first amplifier to a second input of the first amplifier; and
    injecting a cancelling current into the second input of the first amplifier through a second amplifier in response to a change in the reference voltage, the cancelling current being substantially equal in magnitude and opposite in polarity to the current of the feedback signal.

12. The method of claim 11, wherein inputting the feedback signal from an output of the first amplifier to the second input of the first amplifier comprises inputting the feedback signal from an output of the first amplifier to an inverting input of the first amplifier.

13. The method of claim 11, further comprising:
detecting a gain of a pulse width modulator (PWM) coupled to the amplifier; and
adjusting a gain of the second amplifier to track the detected gain of the PWM.

14. The method of claim 13, further comprising:
setting at least one fixed gain of a current canceling network that includes the second amplifier, responsible for injecting the cancelling current, the at least one fixed gain being greater than one.

15. The method of claim 14, further comprising:
passing an output of the PWM through a low pass filter.

16. The method of claim 15, wherein setting at least one fixed gain of the current cancelling network comprises setting at least one gain that is a function of the gain through the PWM and the low pass filter.

17. A voltage regulator comprising:
an amplifier operable to receive a reference voltage at a first input;
an RC feedback circuit operable to provide a first feedback signal to a second input of the amplifier, the feedback circuit coupled between an output of the amplifier and the second input of the amplifier;
a current cancellation circuit operable to provide a cancelling current to the second input of the amplifier in response to a change in the reference voltage, wherein the cancelling current is substantially equal in magnitude and opposite in polarity to the current of the first feedback signal provided by the RC feedback circuit.

18. The voltage regulator of claim 17, wherein the current cancellation circuit comprises:
a second amplifier operable to receive the reference voltage; and
a resistor-capacitor (RC) circuit driven by an output of the second amplifier.

19. The voltage regulator of claim 18, wherein a time constant of the resistor-capacitor (RC) circuit in the current cancellation circuit is substantially equal to a time constant of the RC feedback circuit.

20. The voltage regulator of claim 17, further comprising:
a pulse width modulator (PWM) coupled to the output of the amplifier;
an energy storage circuit coupled to an output of the PWM; and
a resistor coupled between the energy storage circuit and the second input of the amplifier, the resistor providing a second feedback signal to the amplifier.

21. The voltage regulator of claim 20, wherein the energy storage circuit is a low pass filter.

* * * * *